(12) United States Patent
Bostick et al.

(10) Patent No.: US 9,407,815 B2
(45) Date of Patent: Aug. 2, 2016

(54) LOCATION AWARE PHOTOGRAPH RECOMMENDATION NOTIFICATION

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 14/542,732

(22) Filed: Nov. 17, 2014

(65) Prior Publication Data

US 2016/0142626 A1 May 19, 2016

(51) Int. Cl.
*H04N 5/232* (2006.01)
*G06F 17/30* (2006.01)

(52) U.S. Cl.
CPC ...... *H04N 5/23222* (2013.01); *G06F 17/30256* (2013.01); *H04N 5/23293* (2013.01)

(58) Field of Classification Search
None
See application file for complete search history.

(56) References Cited

U.S. PATENT DOCUMENTS

| 2004/0183918 | A1  | 9/2004  | Squilla et al. |
| 2010/0074613 | A1* | 3/2010  | Masuno .................. G03B 41/00 396/661 |
| 2011/0050909 | A1* | 3/2011  | Ellenby .................. G03B 17/24 348/207.1 |
| 2011/0314049 | A1* | 12/2011 | Poirier .............. G06F 17/30241 707/769 |
| 2014/0010405 | A1  | 1/2014  | Sivaraman et al. |

OTHER PUBLICATIONS

Parag Kesar et al, A Method and System Recommending Locations for Photography Using a Social Platform, Sep. 17, 2013, IP.com.
Disclosed Anonymously, "Direction/Altitude of Capture" recommendation from Social Networking site while capturing photographs, Jun. 19, 2012, IP.com.

* cited by examiner

*Primary Examiner* — Dennis Hogue
(74) *Attorney, Agent, or Firm* — Patrick J. Daugherty; Driggs, Hogg, Daugherty & Del Zoppo Co., LPA (57) ABSTRACT

Aspects provide for location and time aware photographic scene matching and recommendations by identifying a location of a target scene displayed within a field of view of an electronic display screen of a camera device. A repository is searched for picture(s) related to the identified location and indicated in a social network as attractive. Recommendation information is generated from picture(s) retrieved from the repository search as related to the identified location and indicated in the social network as attractive. Thus, the camera device electronic display screen is driven to present the recommendation information within the field of view of the target scene.

16 Claims, 6 Drawing Sheets

LOCATION AWARE PHOTOGRAPH RECOMMENDATION NOTIFICATION

BACKGROUND

Photography is a common hobby of users around the world. Users often use cameras for capturing memories of travels through photographs. However, novice photographers may lack abilities or knowledge in framing, composing and capturing optimal, attractive photographs. Such deficiencies may limit user satisfaction with the photographs created by users to represent their travels and share with friends.

BRIEF SUMMARY

In one aspect of the present invention, a method for location and time aware photographic scene matching and recommendations includes identifying a location of a target scene that is displayed within a field of view of an electronic display screen of the camera device. A repository is searched for at least one picture that is related to the identified location and indicated in a social network as attractive. Recommendation information is generated from at least one picture that is retrieved from the repository search as related to the identified location and indicated in the social network as attractive. Thus, the camera device electronic display screen is driven to present the recommendation information within the field of view of the target scene.

In another aspect, a method provides a service for location and time aware photographic scene matching and recommendations. The method includes integrating computer-readable program code into a computer system including hardware processor in circuit communication with computer readable memory and a computer readable storage medium. The computer readable program code includes instructions for execution by the processor that cause the processor to identify a location of a target scene displayed within a field of view of an electronic display screen of a camera device, and search a repository for at least one picture that is related to the identified location and indicated in a social network as attractive. The processor thereby generates recommendation information from at least one picture retrieved from the repository search as related to the identified location and indicated in the social network as attractive, and drives the electronic display screen is to present the recommendation information within the field of view of the target scene.

In another aspect, a system has a hardware processor, computer readable memory in circuit communication with the processor, and a computer-readable storage medium in circuit communication with the processor and having program instructions stored thereon. The processor executes the program instructions stored on the computer-readable storage medium via the computer readable memory and thereby identifies a location of a target scene displayed within a field of view of an electronic display screen of a camera device, and searches a repository for at least one picture that is related to the identified location and indicated in a social network as attractive. The processor thereby generates recommendation information from at least one picture retrieved from the repository search as related to the identified location and indicated in the social network as attractive, and drives the electronic display screen is to present the recommendation information within the field of view of the target scene.

In another aspect, a computer program product for location and time aware photographic scene matching and recommendations has a computer-readable storage medium with computer readable program code embodied therewith. The computer readable program code includes instructions for execution by a processor that cause the processor to identify a location of a target scene displayed within a field of view of an electronic display screen of a camera device, and search a repository for at least one picture that is related to the identified location and indicated in a social network as attractive. The processor thereby generates recommendation information from at least one picture retrieved from the repository search as related to the identified location and indicated in the social network as attractive, and drives the electronic display screen is to present the recommendation information within the field of view of the target scene.

BRIEF DESCRIPTION OF THE SEVERAL VIEWS OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
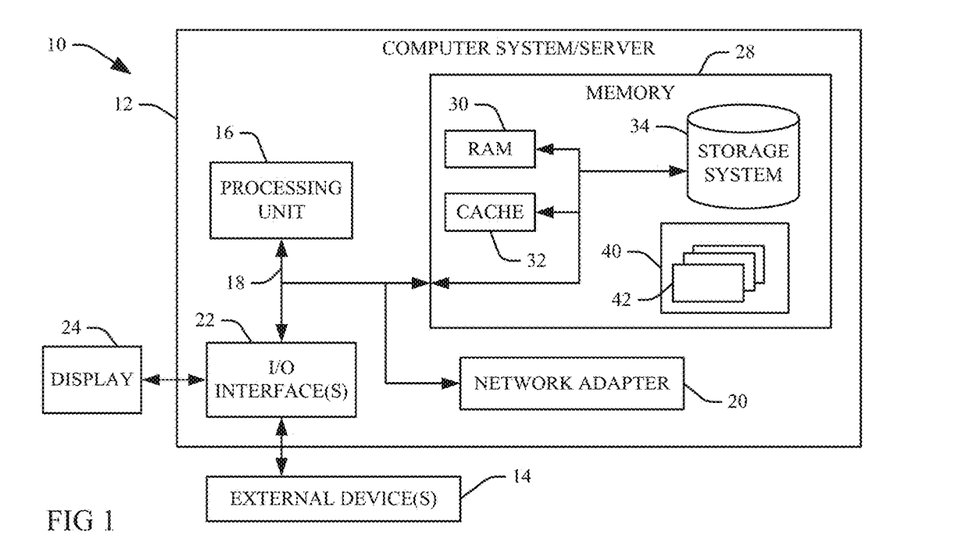
FIG. 1 depicts a cloud computing node according to an embodiment of the present invention.

Referring now to Figure ("FIG.") 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media, can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of a non-limiting example, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that, although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
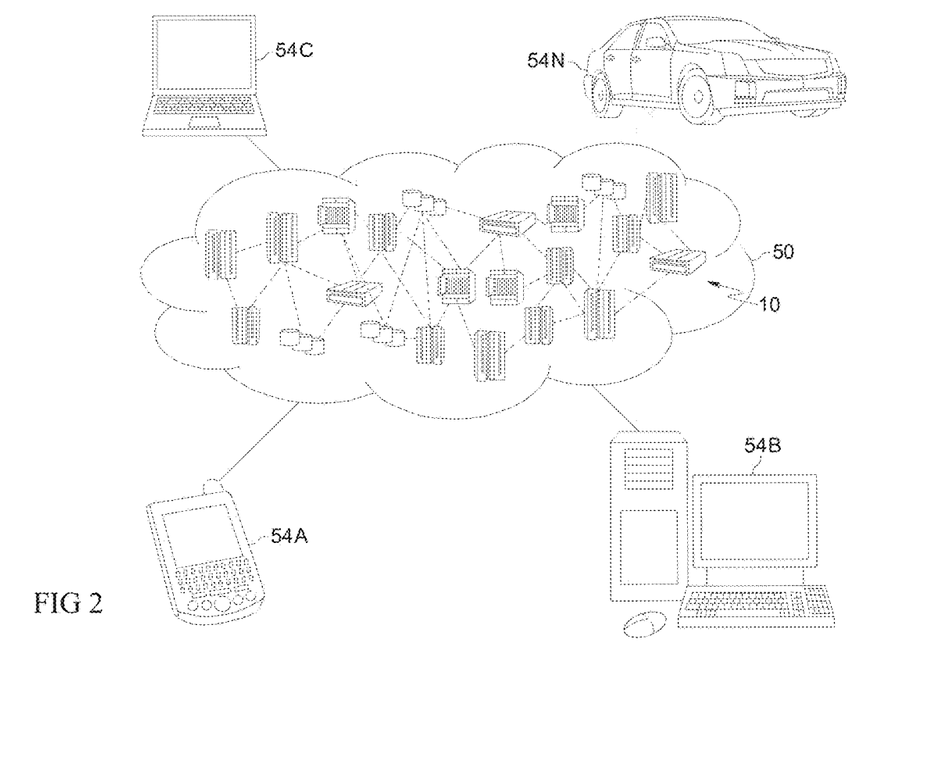
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
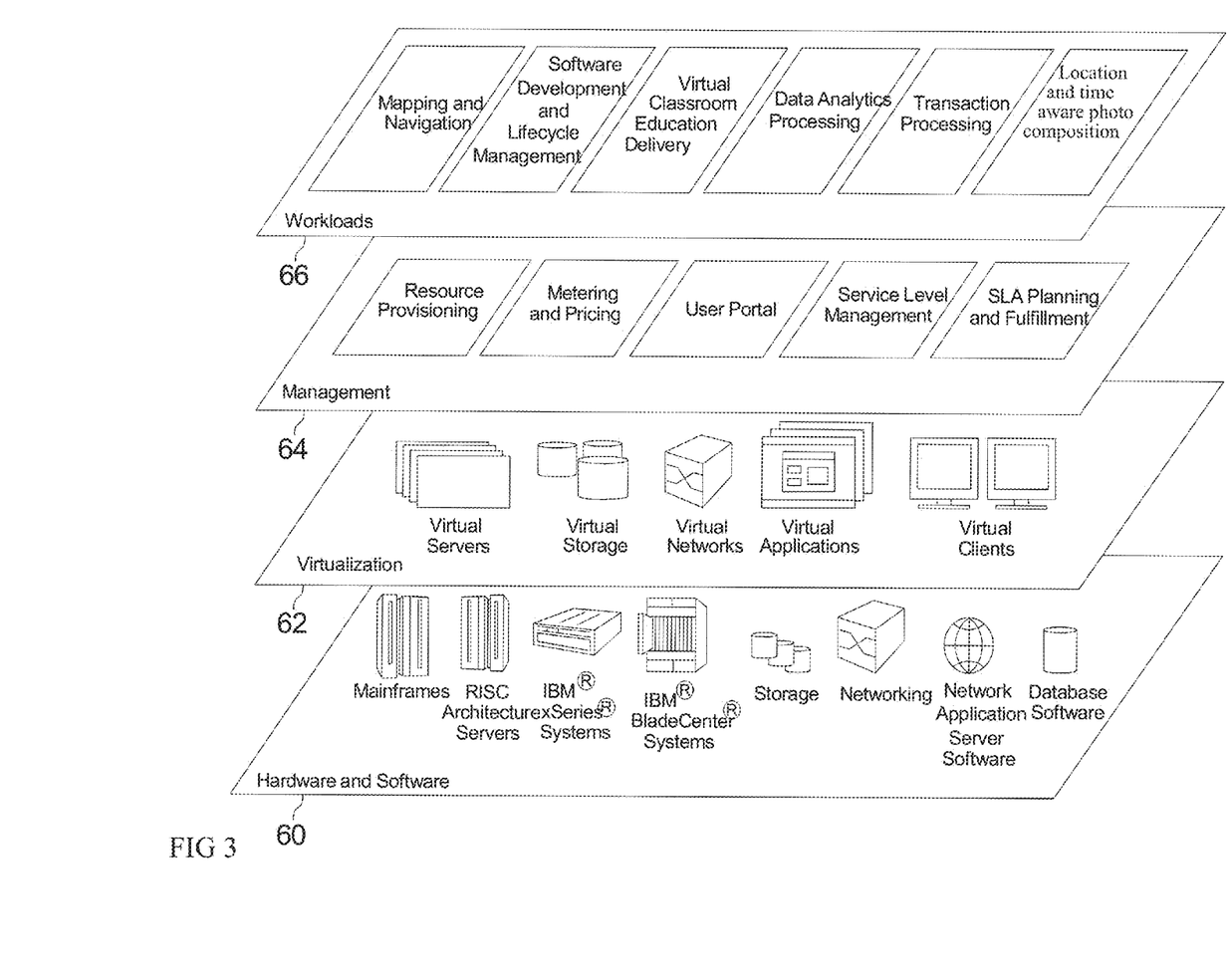
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and location and time aware photographic composition recommendations (as described more particularly below).

In one aspect, a service provider may perform process steps of the invention on a subscription, advertising, and/or fee basis. That is, a service provider could offer to integrate computer readable program code into the computer system/server 12 to enable the computer system/server 12 to perform process steps of the invention. The service provider can create, maintain, and support, etc., a computer infrastructure, such as the computer system 12, bus 18, or parts thereof, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 12, from a tangible computer readable medium device 34; (2) adding one or more computing devices to the computer infrastructure 10; and (3) incorporating and/or modifying one or more existing systems 12 of the computer infrastructure 10 to enable the computer infrastructure 10 to perform process steps of the invention.

Figure 4:
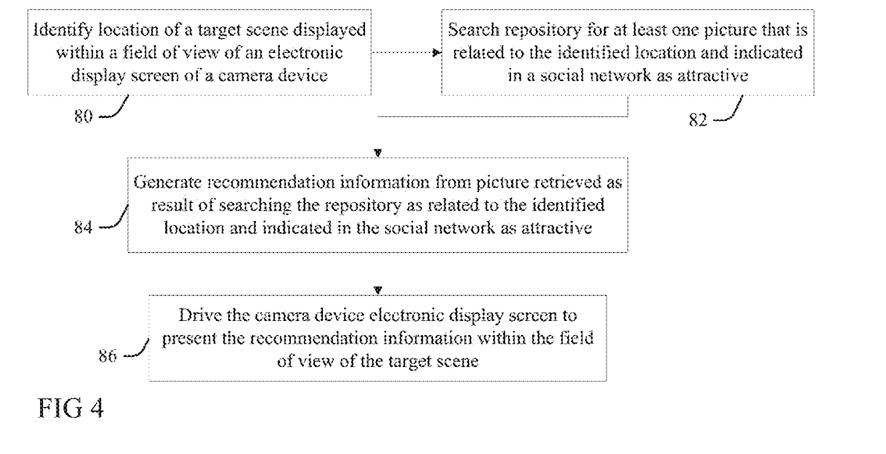
FIG. 4 is a flow chart illustration of a method or process according to the present invention for location and time aware photographic matching and recommendations.

FIG. 4 illustrates a method or process of an aspect of the present invention for location and time aware photographic scene matching and recommendations. At 80 a location of a target scene that is displayed within a field of view of an electronic display screen of a camera device is identified. At 82 a repository is searched for at least one picture that is related to the identified location and indicated in a social network as attractive. At 84 recommendation information is generated from a picture that is retrieved as a result of the searching of the repository at 82 as related to the identified location and indicated in the social network as attractive. At 86 the camera device electronic display screen is driven to present the recommendation information within the field of view of the target scene, and thus to a user viewing the scene via the electronic display screen.

Figure 5:
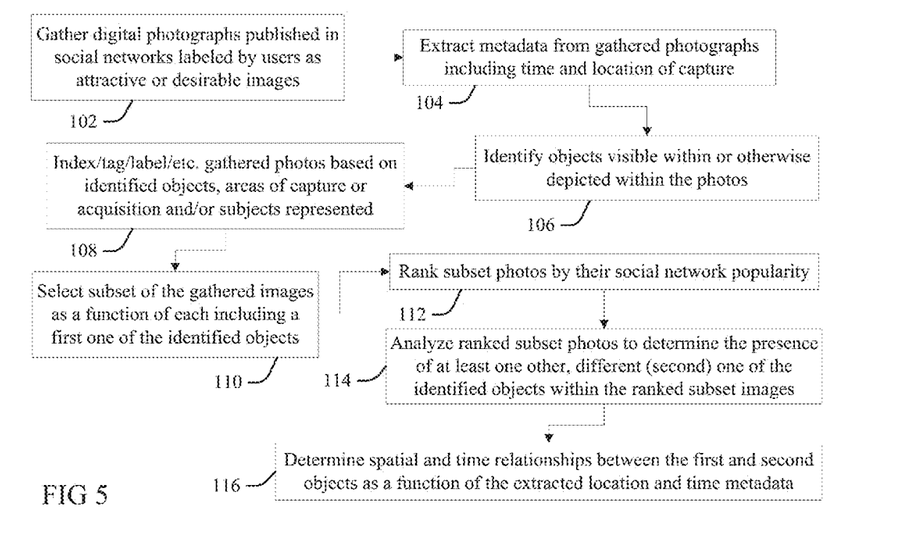
FIG. 5 is a flow chart illustration of another method or process according to the present invention for location and time aware photographic matching and recommendations.

FIG. 5 illustrates another method or process of an aspect of the present invention for location and time aware photographic matching and recommendations. A server or other computerized device including a processor executes software and is thereby transformed or transfigured to a programmable repository device that at 102 gathers digital photographs that are published in private or public domains from private or public, social community, forum or networks (hereinafter "social networks") and labeled by users of said social networks as attractive or desirable images. Illustrative but not exhaustive examples of social networks include Facebook®, Flickr®, Picasa®, and still others will be apparent to one skilled in the art. (FACEBOOK is a trademark of Facebook, Inc. in the United States or other countries; FLICKR is a trademark of Yahoo!, Inc. in the United States or other countries; PICASA is a trademark of Google, Inc. in the United States or other countries.)

Users often post the photographs on such social network sites. One measure of photo value or attractiveness is the number of "likes" a photograph receives from other users of the site. In addition, users can also post comments. These ratings and comments are used to indicate and gather relatively more attractive images at 102, relative to other images for the same areas, subjects or objects that have fewer "likes" or other positive comments, tags, or lower ratings or rankings applied by users of the social networks. The photographs may also be selectively gathered at 102 based on criteria, in order to prioritize the selection of images of certain sites of interest or subjects over other images. For example, top sites within a given, popular tourist destination, state, city, etc., or most preferred wildlife images, may be prioritized for selection over other areas or images of wildlife.

At 104 the repository device extracts metadata from the gathered photographs that includes time of capture (from timestamps and other time of creation data), and location of capture (from Geo-tags, GPS (geographic positioning satellite) coordinate or other geographic location metadata of the photo images). At 106 the repository device identifies objects visible within or otherwise depicted within the photos, and at 108 indexes (or tags, labels or otherwise organizes) the gathered photos based on the identified objects, locations of capture or acquisition and/or subjects represented by the identified objects.

The objects may be identified at 106 by object naming metadata extracted from the photos: illustrative but not exhaustive examples include user applied tags and labels, such as "Eiffel tower at sunset," "Doe and fawn," etc. Objects may also be identified at 106 by image analysis, wherein image blob data may be distinguished as objects from other object blobs and foreground or background image data, and identified as function of matching the extracted blobs to learned models of object images, for example matching an extracted image blob data to an image model of a deer doe, stag or fawn. Such processes may readily identify well-known and unique landmarks, such as images of the Eiffel tower or Mount Rushmore relief sculptures, the gateway arch in St. Louis, Mo., USA, natural arches or mountains within parks, etc. Buildings or areas thereabout may also be identified by optical character recognition (OCR) process applied to discernible text logos or signage visible on structures within the image data.

The time and geographic location metadata extracted at 104 may be used to identify and locate the objects, or provide context to aid in the identification of the object at 106. For example, GPS data indicating a proximity to the Eiffel Tower may increase a probability that an identified object within an image is the Eiffel Tower. A nighttime time of capture may confirm an identification of the moon as an object in an image. Location data may also indicate a perspective, scale or viewpoint of an identified object within the photo, or provide context to help identify objects that are detected in the image via the image analysis.

At 110 a subset of the gathered images is selected as a function of each including a first one of the identified objects, and at 112 the subset photos are ranked by their social network popularity. At 114 the ranked, subset images are analyzed to determine the presence of at least one other (second) one of the identified objects of images within at least the higher or most popular of the ranked, subset of images. At 116 spatial and time relationships between the first and second objects in (at least the higher/highest ranked of) the subset images are determined as a function of the extracted location and time metadata. The relationships may also be determined at 116 as a function of their ranked popularity of the images, thus ranking the images having both first and second objects as a function of their relative spatial relationships, wherein some spatial relationships or relative arrangements within visual compositions in the photos are ranked higher than others.

Figure 6:
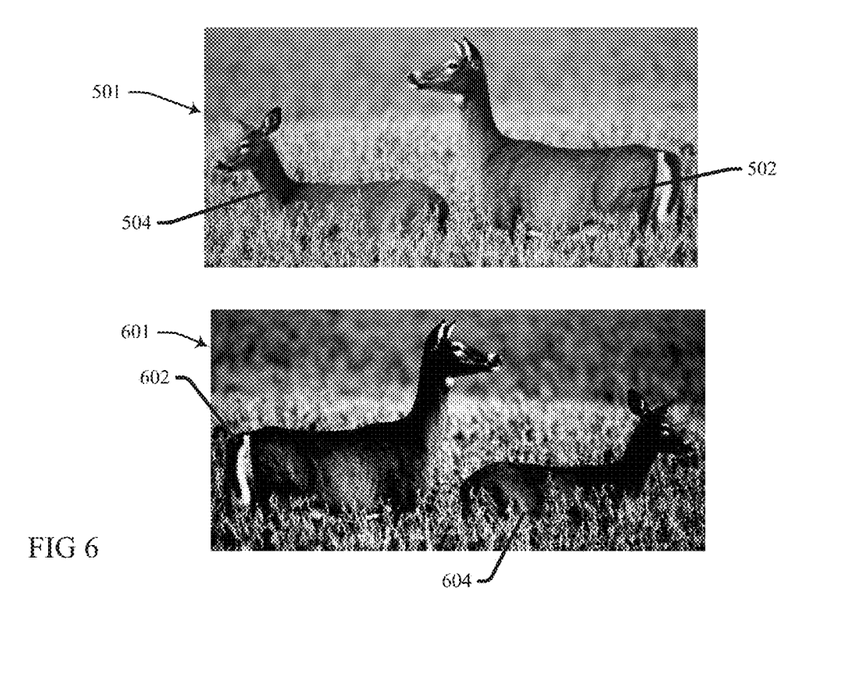
FIG. 6 is a graphical depiction of photographs appropriate to aspects of the present invention.

The presence of more than one object of interest in a photo can enhance its effectiveness, interest, or beauty, and increase the attractiveness of a photograph of a common scenes and subject relative to another photo of the same scene with only one object of interest. For example, FIG. 6 depicts two photos 501 and 601. Photo 501 is found popular in a social network and determined to be captured from a particular park meadow, or categorized as wildlife/deer photography, on a summer date at a morning time. Photo 501 includes a doe 502 and a fawn 504, wherein the fawn 504 is to the left of the doe 502. Photo 601 is captured from the same park meadow, but on a fall date at an early evening time around sunset, thus with different apparent lighting and illumination levels due to a dusk or twilight illumination condition) that includes another doe 602 and a fawn 604, but wherein the fawn 604 is to the right of the doe 602. The photos 501 and 601 are categorized in a subset (at 108) based on fawns 504 and 604 as a common first object, and both have high popularity relative to other fawn object photos taken in this park, but wherein the first photo 501 is ranked more popular than the second 601. Analysis of the photos 501 and 601 (at 110) identifies the does 502 and 602 as second objects in each photo, and (at 112) their spatial and time relationships are determined as a function of their popularity: in the more popular photo 501 a primary (fawn) object 504 is to the left of a secondary (doe) object 502, and also noting that the image 501 is acquired in summer at morning, wherein these attributes may indicate a more popular image composition over the composition (primary (fawn) object 604 to the right of the secondary (doe) object 602) and/or other attribute of the other image 601 (image acquired in fall, near sunset, with different levels of illumination, contrast, etc.).

Figure 7:
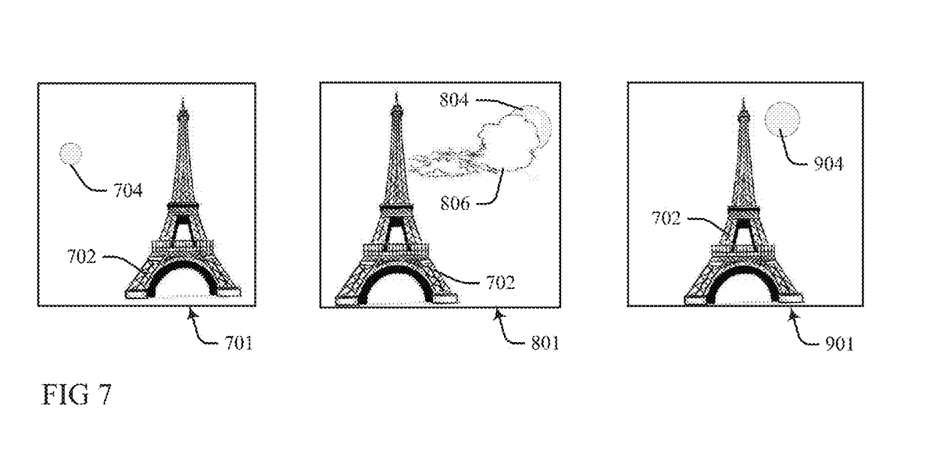
FIG. 7 is a graphical depiction of a subset of photos that are stored or indexed by a repository according to aspects of the present invention.

FIG. 7 depict a subset of photos 701, 801 and 901 that are stored or indexed by a repository (for example, at 108 of FIG. 5) as including the Eiffel Tower 702 as a first object, and wherein the moon is visible in all three as a common secondary object 704, 804 and 904, respectively, at different apparent positions and sizing relative to the Eiffel Tower 702. In the present example each of the images 701, 801 and 901 are captured from a similar camera perspective (zoom level relative to a location of the camera) but at different times and dates (as indicated by their capture metadata), and also present the secondary moon objects 704, 804 and 904 with different prominence (scale) and/or clarity (for example, partially obscured by a third, cirrus cloud object 806 determined/identified in photo 801.

Figure 8:
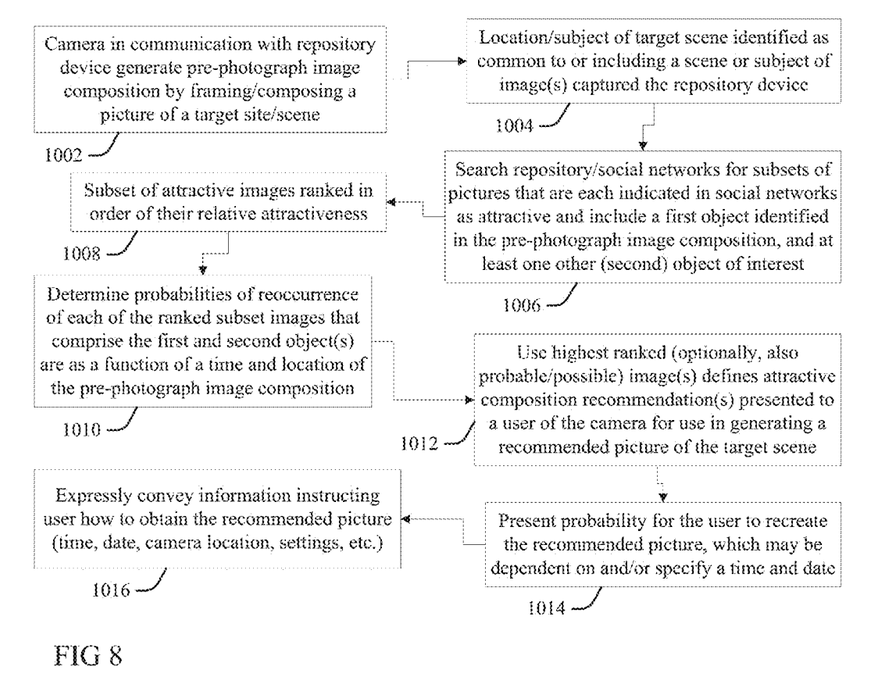
FIG. 8 is a flow chart illustration of another method or process according to the present invention.

FIG. 8 illustrates a process, system or method implemented by a camera device according to the present invention for driving electronic display screens to present recommendation information within the field of view of the target scene presented to the user, (for example, at 86 of FIG. 4). At 1002 a camera in communication with a repository device generates a pre-photograph image composition by framing or composing a picture of a target site or scene. At 1004 the location or subject of the target scene is identified as common to or including a scene or subject of at least one of the images captured in the repository device, as described above with respect to FIG. 5 at 102.

The camera may be in communication with the repository device via a public or private network, for example wherein the repository device is a remote server. The camera may also be part of an apparatus or system that includes, or is in direct circuitry communication with, the repository device. Examples of cameras and camera systems and apparatuses include smart phones, tablet and other computerized devices with integrated camera components; augmented reality (AR) glasses, such as Google Glass™, and other head-mounted mobile devices that enable users to capture pictures of their viewpoint while wearing the glasses/devices; and digital or single-lens reflex (SLR) analog cameras that have communication modules or components in communication via a network with the repository device. (GOOGLE GLASS is a trademark of Google, Inc. in the United States or other countries.) In some aspects the cameras or related devices are network enabled by incorporating WiFi or cellular data modules that can subscribe to services that perform some or all of the functions or steps depicted in FIG. 5.

The steps of FIG. 5 may be practiced independently of the camera functions, and thus in advance of the image framing at 1002, or they may be performed by the camera or repository device in response to the image framing at 1002, including in real time. Thus, identifying the location or subject of the target scene (at 116, FIG. 5) may occur in real time via analysis of objects in the target scene, or it may be established from advance travel planning, such as from a published itinerary or a route mapped through a mapping program.

At 1006 the repository (and/or social networks) is searched for subsets of pictures that have been indicated in social networks as attractive and are related to the determined area or subject, and more particularly wherein each of the subset of attractive photos include a first object identified in the pre-photograph image composition, and at least one other (second) object of interest.

At 1008 the subset images that are ranked in order of their relative attractiveness, thus identifying more or most preferred ones of the subset of attractive images. In some embodiments, at 1010 probabilities of reoccurrence of each of the ranked subset images that comprise the first and at least one second objects are determined as a function of a time and location of the camera pre-photograph image composition.

At 1012 at least one of the highest ranked images is used to define at least one attractive composition recommendation that is presented to a user of the camera for use in generating a recommended picture of the target scene. In aspects wherein the probabilities of reoccurrence are determined at 1010, the presentation at 1012 is of the highest ranked and also probable/possible images, and includes at 1014 a probability for the user to recreate the recommended picture, which may be dependent on and specify a time and date.

The attractive composition recommendations at 1012/1014 may inherently, or at 1016 expressly convey, information instructing the user how to obtain the recommended picture (time, date, location, etc.). For example, the presentment at 1012 may inherently convey an orientation and distance of the camera to the objects via an orientation and scale apparent in depicted composition of a recommended picture. Alternatively, or in addition thereto, at 1016 text or audio or other information may provide location and orientation indicia (for example, GPS coordinates, street address, angle with horizon or vertical perspective, zoom or exposure or flash settings, etc.)

Figure 9:
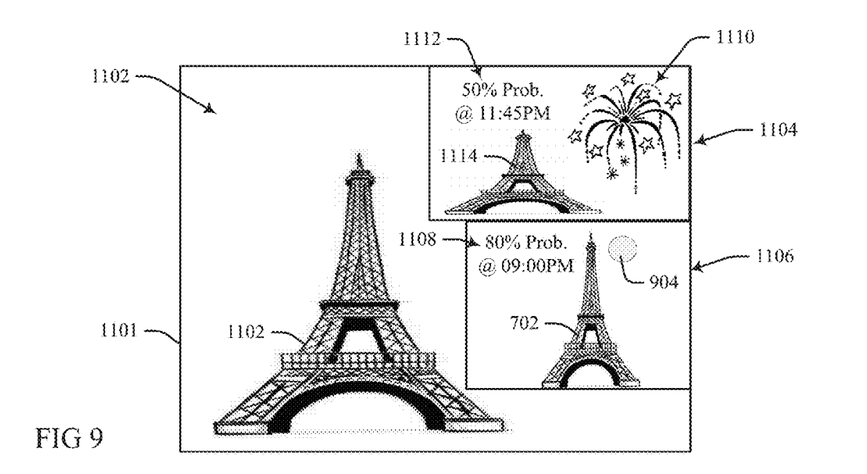
FIG. 9 is graphical depiction of a display of attractive composition recommendations according to the present invention.

FIG. 9 illustrates one example of wherein two attractive composition recommendations 1104 and 1106 are generated for a pre-photograph image composition 1102 that is analyzed and thereby determined to include the Eiffel Tower 1103. The pre-photograph image composition 1102 is further located in time and space relative to the Eiffel Tower 1103 via current GPS and network time data of the camera.

The composition recommendations 1004 and 1006 are each captured photographs from the repository device that are displayed in different, respective inset portions of the camera viewfinder display 1101 used by the user to frame the pre-photograph image composition 1002.

Composition recommendation 1006 is the photo 901 of FIG. 7, and is selected a highly popular from a subset of attractive images (as ranked at 1008, FIG. 8) that include the Eiffel Tower 1102 as a primary object, and includes an Eiffel Tower view 702 and the moon 904 as a second object. The composition recommendation 1006 also includes a text notice 1108 that notifies the user that the user has an 80% probability of creating this composition (with the camera used to generate the pre-photo composition 1102) as a generated picture at a certain time in the future: 9:00 PM on this same day (date). This is only one example, for example, the text information 1108 may also be conveyed as an audio message generated and presented to the user via earphones or other speaker media.

Visually comparing the pre-photo scene composition 1102 and the composition recommendation 1006 inherently indicates to the user that the respective camera locations used to capture the compositions 1102 and 1106 appear similar, and therefore that the user need not move or relocate the camera from a current position or orientation used to compose the pre-photograph image composition 1002.

The probability is determined (at 1010) as a function of variety of input data. In this example the 80% certainty reflects current weather forecasts that indicate an 80% chance that no heavy clouds or rain will occlude the moon 1005 at 9:00 PM. In some examples it may reflect historic probabilities for this date and time. An alternative composition recommendation (not shown) may be generated from the image composition of photo 801 of FIG. 7 and suggest another, future time to take the picture wherein the weather forecast indicates high cirrus clouds in the evening, so that the moon is partially obscured by a third, cirrus cloud object (similar to the cloud object 806 of photo 801).

Another composition recommendation 1004 includes a fireworks display 1110 as a second object, and includes a text notice 1112 that notifies the user that this composition 1104 may be obtained as a generated picture at a 50% probability at 11:45 PM, perhaps reflecting an increasing chance of rain or heavy clouds relative to the earlier time (09:00 PM) of the other recommendation 1106, or only a 50% chance of fireworks on this same date historically.

Visually comparing the pre-photo scene composition 1102 and the second composition recommendation 1104 inherently indicates to the user that the respective camera locations capturing the scene compositions are different. More particularly, the scale of the Eiffel Tower image 1114 in the composition recommendation 1104 is larger, and has a more vertical orientation, relative to the view of the tower 1102 in the pre-photo composition 1102, which indicates to the user that the camera must be relocated to another location more underneath and closer to the Eiffel Tower in order to acquire an image similar to the recommendation 1104.

In another example, a pre-photograph image composition (not shown) is determined to be of a single deer at the particular park meadow (via current GPS and network time data of the camera), or of a deer object categorized within the wildlife/deer photography subject matter, of the ranked fawn and doe images, for example, the photos 501 and 601 of FIG. 6. As a function of the image analysis of the best/highest ranked photo images 501 and 601 found to be applicable to the a pre-photograph image composition (at 1012, FIG. 8), a text or audio message may be generated and presented to the user (at 1016, FIG. 8) to recommend that the camera user wait until an additional deer is present within the image composition before taking the picture, preferably a fawn, and most preferably a fawn located to the left of the deer. The recommendation may also suggest times of day and dates of the images 501 and 601 as likely to present multiple deer objects within the image at this particular park meadow, or to prefer the time or season of one over the other.

Aspects of the present invention thus provide photographers with notifications of opportunities and recommendations for creating photos of their surroundings that have known (or likely) attractive object framing and compositional attributes. Users are enabled to capture more desirable or optimal photos, relative to the photos they may create without the information provided by the notifications. This may enhance user satisfaction in the end product created, the photograph, by increasing the attractiveness and value of the photograph.

In the present examples, it is the inclusion of two or more object points of interest in an image that has been found to increase the attractiveness, ranking and perceived value of the photograph over other captured photographs that have only one, main object of interest. While capturing a photograph in any location, or of an object categorized by subject, a user may not be presented with a composition that includes another object that has been found in social media to increase the attractiveness of a generated image. In some cases, there may be better times of day, weather conditions, seasons or opportunities unknown to take another photograph having a spatial relationship between the two objects that is determined by processes of the present invention to define an image composition (of more than one object of interest) that is to be more attractive than the current composition.

Aspects determine the spatial relationships of the objects in such popular photos, and use real-time notifications of current and presently available photographic opportunities, as well as providing advance notices for future opportunities that may be used in travel planning. For example, aspects enable a user to schedule a trip to a certain location at a certain future time in order to acquire a photograph of a projected, future object composition occurring at that time at the indicated site or vantage point.

The location and time of the photo, combined with recommendations by others using social media likes, comments, etc. are used as recommendation criteria. An itinerary can be set up based on desired places of interest compared with notably popular times to create the perfect pictures. Weather events may be taken into account and used to adjust probabilities and generate the notifications or content thereof.

Figure 10:
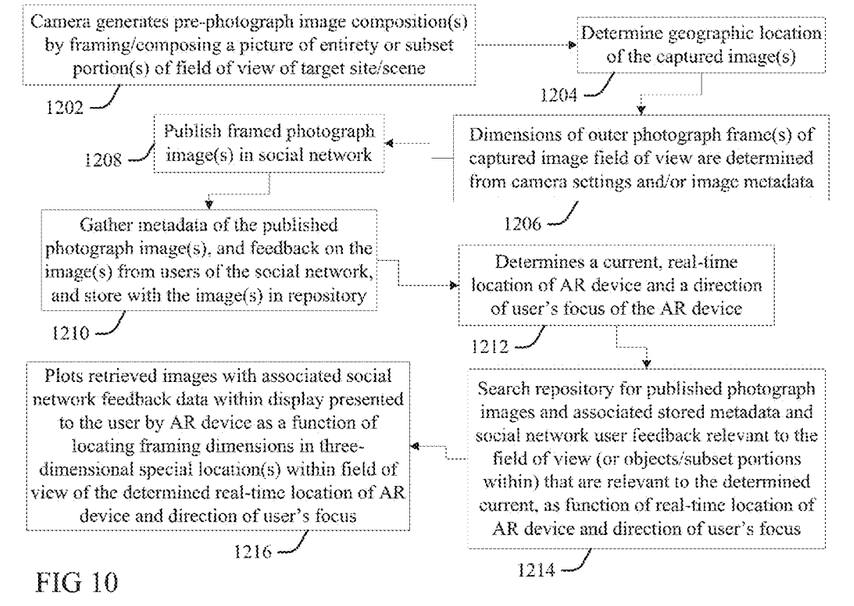
FIG. 10 is a flow chart illustration of another method or process according to the present invention.
Figure 11:
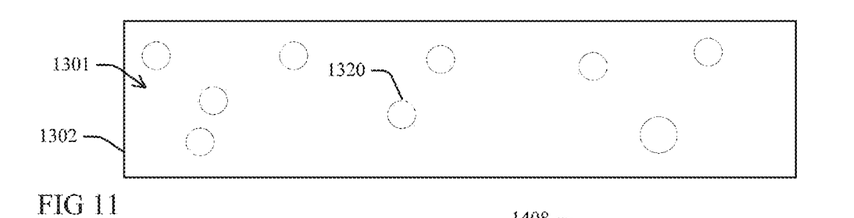
FIG. 11 is a graphical depiction of a two-dimensional representation of a view of a three-dimensional field of view of a user according to the present invention.
Figure 12:
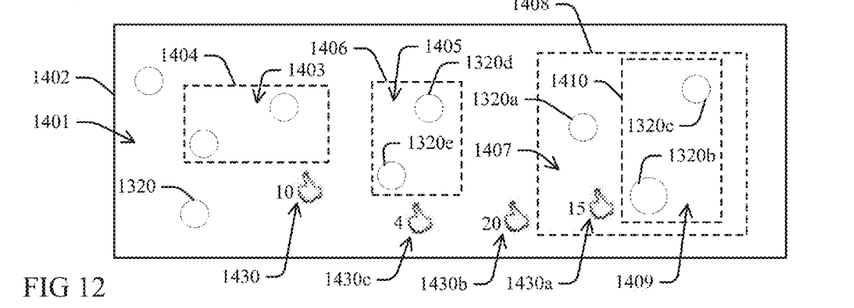
FIG. 12 is a graphical depiction of the presentation of recommendation data according to the present invention relative to the view of FIG. 11.

FIG. 10 illustrates another process, system or method of the present invention that utilizes the capabilities of Augmented Reality (AR) glasses for real-time photographic frame visualizing and social network data generation and gathering with respect to driving electronic display screens to present recommendation information within the field of view of the target scene presented to the user, of portions or subsets thereof (for example, at 86 of FIG. 4). FIG. 11 illustrates a two-dimensional representation of a view 1301 of a three-dimensional field of view of a user wearing and using a set of AR glasses, wherein a plurality of different objects or locations (addresses, businesses, etc.) 1320 are visible within the view 1301. FIG. 12 illustrates the capture and/or presentation of photographic data 1401 by driving an electronic display screen to present recommendation information within the field of view 1301 by an implementation of the aspect of the invention of FIG. 10.

Thus, at 1202 a photograph input 1401 of an entirety of the field of view 1301, or of one or more subset portions 1403, 1405, 1407 and 1409 of the field of view 1301, are captured by a camera of the AR glasses (or via some other camera input) and provided in real-time as a pre-photograph image inputs for generating photos for storage in a social network-accessible repository, for analysis for the retrieval of photo data from the repository. The subset portions 1403, 1405, 1407 and 1409 may defined about, or as a function of, different respective ones of the objects/locations 1320 are visible within the view 1320. Thus, framed portion 1407 may be defined as including object/locations 1320a, 1320b and 1320c, wherein a sub-portion 1409 within 1407 contains only 1320b and 1320c.

At 1204 the geographic location of the inputs 1401, 1403, 1405, 1407 or 1409 are determined, for example, as a function of GPs, cellular or WiFi location data, directional data of the image capture (from compass data) and/or a zoom level of the captured composition. At 1206 dimensions of the outer photograph frames 1402, 1404, 1406, 1408 and/or 1410 of the respective image portions 1401, 1403, 1405, 1407 or 1409 are determined from camera settings and/or photographic image metadata.

At 1208 the framed photograph image(s) are published in social network. At 1210 metadata of the published photograph image(s), and feedback on the photograph from users of the social network, are gathered and stored with the image(s) in a photograph repository.

The aspect of FIG. 10 enables the plotting on the stored photos and their social network user feedback data on the real-time display of AR glasses. Thus, at 1212, in response to a user subsequently using a head-mounted, AR device to view the same field of view 1301, a process according to the present invention determines a current, real-time location of the AR device and a direction of user's focus of the AR device, and at 1214 searches the repository for published photograph images (and associated stored metadata and social network user feedback) that are relevant to entire field of view 1301 (or to objects 1320 and/or subset portions subset portions 1403, 1405, 1407 and 1409 within) as a function of the determined current, real-time location of the AR device and direction of user's focus.

In response to the search finding and retrieving one or more relevant, published photograph images and their associated stored metadata and social network user feedback, at 1216 the process plots the retrieved images within a display presented to the user by the AR device as a function of locating their framing dimensions 1404, 1406, 1408 and/or 1410 in three-dimensional special locations within the field of view 1301 and the determined direction of user's focus as currently visible through the AR glasses, along with data graphics 1430 that represent (or are determined from) their respective, associated social network comments/feedback data. Thus, the framed photographic image 1407 that includes object/locations 1320a, 1320b and 1320c is retrieved from the repository and plotted on the user's AR glasses display at 1216, along with a data graphic 1430a that comprises a "thumb's up" icon and a count of twenty user "likes," which may inform the user that the objects 1320a, 1320b and 1320c framed within are locations or objects (restaurants, cafes, sculptures, etc.) that are relatively more popular than other objects 1320d and 1320e within frame 1406 (which have only four "likes" per data graphic 1430c). Further, a subset of the objects 1320b and 1320c received fifteen of the twenty "likes" (pursuant to data graphic 1430a), indicating that they are more popular relative to object 1320a.

Determination or identification of the subset portions 1403, 1405, 1407 and 1409, or the objects 1320 within, may be accomplished via automatic, image and metadata analysis processes, or by user manual processes. For example, the user may interact with the field of view 1301/1401 displayed via the AR glasses with finger selection procedures that enable a user to select or define any of the frames 1402, 1404, 1406, 1408 and 1410 frame, instructing the AR device to capture photograph or analyze objects with head mounted display. The user may use his fingers to draw around seen objects, to essentially frame a shot for capture or analysis. Finger gestures may also be used to determine what is in focus, set focal length, tilt shift, and make other photographic or image composition adjustments.

Thus, embodiments of the present invention utilize the tendency of users to capture photos in the same interesting places as other users. Sometimes a user may not realize that a place or specific object presently within their field of view is found interesting or attractive by other, including by their friends, peers, etc. Augmented reality (AR) glasses and other head-mounted mobile devices according to the present invention may use networking and real-time processing abilities to recognize and point out to a user the importance of the object they are looking at, especially with respect to friends, and how they have captured the object in the past.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for location and time aware photographic scene matching and recommendations, the method comprising:

identifying a location of a target scene that is displayed within a field of view of an electronic display screen of the camera device;

identifying a first object of interest to be photographed as a function of the identified location of the target scene;

identifying a second object that is displayed within the field of view of the target scene;

searching a repository for at least one picture that is related to the identified location and indicated in a social network as attractive and that includes the second object;

generating recommendation information comprising a plurality of different recommended photograph compositions, each in association with a different recommended time to capture and depict different spatial relationships of the first object to the second object, as a function of the location of the target scene and a times of capture of the at least one picture retrieved from the searching of the repository;

determining probabilities that the different spatial relationships of the first object to the second object depicted within each of the generated recommended photograph compositions will occur at their associated recommended times; and driving the camera device electronic display screen to present the recommendation information within the field of view of the target scene by presenting the recommended photograph compositions in association with their determined probabilities that the different spatial relationships of the first object to the second object depicted within each of the generated recommended photograph compositions will occur at their associated recommended times of capture.

2. The method of claim 1, further comprising:
integrating computer readable program code into a computer readable storage medium; and
wherein a processor that is in circuit communication with a computer readable memory and the computer readable storage medium executes instructions of the program code integrated on the computer readable storage medium via the computer readable memory and thereby performs the steps of identifying the location of the target scene that is displayed within the field of view of the electronic display screen and the first object of interest and the second object, searching the repository for the at least one picture related to the identified location and indicated in the social network as attractive and that includes the second object, generating the recommendation information comprising the plurality of different recommended photograph compositions, determining the probabilities that the different spatial relationships of the first object to the second object depicted within each of the generated recommend photograph compositions will occur at their associated recommended times, and driving the camera device electronic display screen to present the recommendation information within the field of view of the target scene by presenting the recommended photograph compositions in association with their determined probabilities that the different spatial relationships of the first object to the second object depicted within each of the generated recommend photograph compositions will occur at their associated recommended times of capture.

3. The method of claim 1, wherein the step of identifying the location of the target scene that is displayed within the field of view of the electronic display screen of the camera device is performed by establishing the location from at least one of a published itinerary, a route mapped through a mapping program, and current location data determined by the camera device.

4. The method of claim 1,
wherein the at least one picture retrieved from the searching of the repository is a plurality of pictures that each include the first object and the second object, and wherein the plurality of retrieved pictures differ from one another as a function of at least one of a time of capture, and a different depicted spatial relationship of the first object to the second object.

5. The method of claim 1, wherein the step of determining the probabilities for capturing each of the generated recommended photograph compositions at their respective, recommended times is a function of weather forecasts for the identified location of the target scene at the recommended times.

6. The method of claim 1, further comprising:
ranking the generated recommended photograph compositions as a function of at least one of their different, respective social network attractiveness rankings, and their different respective probabilities for capturing each of the generated recommended photograph compositions at their respective, recommended times; and
selecting a highest ranked subset of the generated plurality of recommended photograph compositions; and
wherein the step of driving the camera device electronic display screen to present the recommendation information within the field of view of the target scene comprises presenting the highest ranked subset of the recommended photograph compositions in association with their determined probabilities that the different spatial relationships of the first object to the second object depicted within each of the generated recommended photograph compositions will occur at their associated recommended times of capture.

7. A system, comprising:
a processor;
a computer readable memory in circuit communication with the processor; and
a computer readable storage medium in circuit communication with the processor;
wherein the processor executes program instructions stored on the computer readable storage medium via the computer readable memory and thereby:
identifies a location of a target scene that is displayed within a field of view of an electronic display screen of a camera device;
identifies a first object of interest to be photographed as a function of the identified location of the target scene;
identifies a second object that is displayed within the field of view of the target scene;
searches a repository for at least one picture that is related to the identified location and indicated in a social network as attractive and that includes the second object;
generates recommendation information comprising a plurality of different recommended photograph compositions, each in association with a different recommended time to capture and depict different spatial relationships of the first object to the second object, as a function of the location of the target scene and a times of capture of the at least one picture retrieved from the searching of the repository;
determines probabilities that the different spatial relationships of the first object to the second object depicted within each of the generated recommended photograph compositions will occur at their associated recommended times; and
drives the camera device electronic display screen to present the recommendation information within the field of view of the target scene by presenting the recommended photograph compositions in association with their determined probabilities that the different spatial relationships of the first object to the second object depicted within each of the generated recommended photograph compositions will occur at their associated recommended times of capture.

8. The system of claim 7, wherein the processor executes the program instructions stored on the computer readable storage medium via the computer readable memory and thereby further identifies the location of the target scene that is displayed within the field of view of the electronic display screen of the camera device by establishing the location from at least one of a published itinerary, a route mapped through a mapping program, and current location data determined by the camera device.

9. The system of claim 7, wherein the processor executes the program instructions stored on the computer readable storage medium via the computer readable memory and thereby:
determines the probabilities for capturing each of the generated recommended photograph compositions at their respective, recommended times as a function of weather forecasts for the identified location of the target scene at the recommended times.

10. The system of claim 7, wherein the processor executes readable memory and thereby:
retrieves from the searching of the repository a plurality of pictures that each include the first object and the second object, and wherein the plurality of retrieved pictures differ from one another as a function of at least one of a time of capture, and a different depicted spatial relationship of the first object to the second object.

11. The system of claim 10, wherein the processor executes the program instructions stored on the computer readable storage medium via the computer readable memory and thereby:
ranks the generated recommended photograph compositions as a function of at least one of their different, respective social network attractiveness rankings, and their different respective probabilites for capturing each of the generated recommended photograph compositions at their respective, recommended times; and
selects a highest ranked subset of the generated plurality of recommended photograph compositions; and
drives the camera device electronic display screen to present the recommendation information within the field of view of the target scene by comprised by presenting the highest ranked subset of the recommended photograph compositions in association with their determined probabilities that the different spatial relationships of the first object to the second object depicted within each of the generated recommended photograph compositions will occur at their associated recommended times of capture.

12. A computer program product for location and time aware photographic scene matching and recommendations, the computer program product comprising:
a computer readable storage medium having computer readable program code embodied therewith, the computer readable program code comprising instructions for execution by a processor that cause the processor to:
identify a location of a target scene that is displayed within a field of view of an electronic display screen of a camera device;
identify a first object of interest to be photographed as a function of the identified location of the target scene;
identify a second object that is displayed within the field of view of the target scene;
search a repository for at least one picture that is related to the identified location and indicated in a social network as attractive and that includes the second object;
generate recommendation information comprising a plurality of different recommended photograph compositions, each in association with a different recommended time to capture and depict different spatial relationships of the first object to the second object, as a function of the location of the target scene and a times of capture of the at least one picture retrieved from the searching of the repository;
determine probabilities that the different spatial relationships of the first object to the second object depicted within each of the generated recommended photograph compositions will occur at their associated recommended times; and
drive the camera device electronic display screen to present the recommendation information within the field of view of the target scene by presenting the recommended spatial relationships of the first object to the second object depicted within each of the generated recommended photograph compositions will occur at their associated recommended times of capture.

13. The computer program product of claim 12, wherein the computer readable program code instructions for execution by the processor further cause the processor to identify the location of the target scene that is displayed within the field of view of the electronic display screen of the camera device by establishing the location from at least one of a published itinerary, a route mapped through a mapping program, and current location data determined by the camera device.

14. The computer program product of claim 12, wherein the computer readable program code instructions for execution by the processor cause the processor to:
determine the probabilites for capturing each of the generated recommended photograph compositions at their respective, recommended times as a function of weather forecasts for the identified location of the target scene at the recommended times.

15. The computer program product of claim 12, wherein the computer readable program code instructions for execution by the processor cause the processor to:
retrieve from the searching of the repository a plurality of pictures that each include the first object and the second object, and wherein the plurality of pictures differ from one another as a function of at least one of a time of capture, and a different depicted spatial relationship of the first object to the second object.

16. The computer program product of claim 15, wherein the computer readable program code instructions for execution by the processor cause the processor to:
rank the generated recommended photograph compositions as a function of at least one of their different, respective social network attractiveness rankings, and their different respective probabilities for capturing each of the generated recommended photograph compositions at their respective, recommended times;
select a highest ranked subset of the generated plurality of recommended photograph compositions; and
drive the camera device electronic display screen to present the recommendation information within the field of view of the target scene by comprised by presenting the highest ranked subset of the recommended photograph compositions in association with their determined probabilities that the different spatial relationships of the first object to the second object depicted within each of the generated recommended photograph compositions will occur at their associated recommended times of capture.

* * * * *